United States Patent
Osada et al.

(10) Patent No.: US 6,737,781 B2
(45) Date of Patent: May 18, 2004

(54) ROTOR YOKE HAVING A RING-LIKE INDUCTOR FORMING MEMBER FOR AN ELECTRIC MACHINE ROTOR

(75) Inventors: Takahiro Osada, Numazu (JP); Yoshimasa Serizawa, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/836,617

(22) Filed: Apr. 17, 2001

(65) Prior Publication Data

US 2001/0033118 A1 Oct. 25, 2001

(30) Foreign Application Priority Data

Apr. 19, 2000 (JP) .................................. 2000-117568

(51) Int. Cl.$^7$ ..................... H02K 21/12; H02K 21/00; H02K 1/22
(52) U.S. Cl. .................. 310/156.28; 310/156.29; 310/156.12; 310/156.13; 310/156.14; 310/156.08; 310/156.01; 310/152; 310/268; 310/67 D; 310/67 R
(58) Field of Search ............... 310/156.12–156.14, 310/156.28–156.29, 156.01, 156.08, 152, 268, 67 D, 67 R, 40 R, 10, 68 D

(56) References Cited

U.S. PATENT DOCUMENTS

| | | | | | |
|---|---|---|---|---|---|
| 3,083,314 A | * | 3/1963 | Ratajski | ...................... | 310/219 |
| 3,925,694 A | * | 12/1975 | Richter et al. | ............. | 310/68 D |
| 4,361,776 A | * | 11/1982 | Hayashi et al. | ............. | 310/268 |
| 4,795,924 A | * | 1/1989 | Kamiyama et al. | ........ | 310/67 R |
| 4,877,986 A | * | 10/1989 | Shimizu | ..................... | 310/153 |
| 5,179,872 A | * | 1/1993 | Pernice | .......................... | 74/572 |
| 5,581,139 A | * | 12/1996 | Toukola | ....................... | 310/105 |
| 5,625,241 A | * | 4/1997 | Ewing et al. | ........... | 310/156.37 |
| 5,744,887 A | * | 4/1998 | Itoh | ...................... | 310/156.28 |
| 5,998,902 A | * | 12/1999 | Sleder et al. | ............... | 310/153 |
| 6,309,190 B1 | * | 10/2001 | Chen | ........................ | 417/423.1 |
| 6,452,301 B1 | * | 9/2002 | Van Dine et al. | ........ | 310/156.12 |
| 6,479,916 B1 | * | 11/2002 | Bobay et al. | .................. | 310/89 |
| 6,483,209 B1 | * | 11/2002 | Horng et al. | .................. | 310/51 |
| 6,633,106 B1 | * | 10/2003 | Swett | ......................... | 310/268 |
| 6,661,132 B2 | * | 12/2003 | Kobayashi | .................... | 310/51 |

FOREIGN PATENT DOCUMENTS

| | | | | |
|---|---|---|---|---|
| JP | 56038962 A | * | 4/1981 | .......... H02K/13/00 |
| JP | 56038964 A | * | 4/1981 | .......... H02K/13/00 |
| JP | 59-173477 | | 11/1984 | |
| JP | 100976/1988 | | 6/1988 | |
| JP | 150470/1989 | | 10/1989 | |
| JP | 78180/1993 | | 10/1993 | |
| JP | 39284/1995 | | 7/1995 | |
| JP | 02238232 A | * | 2/2001 | .......... H02K/3/34 |
| JP | 2003088074 A | * | 3/2003 | .......... H02K/21/22 |

* cited by examiner

*Primary Examiner*—Burton S Mullins
*Assistant Examiner*—Pedro J. Cuevas
(74) *Attorney, Agent, or Firm*—Pearne & Gordon LLP

(57) ABSTRACT

A rotor for an electric rotary machine having signal generating inductor magnetic poles provided on a periphery thereof comprising a cup-like rotor yoke having a peripheral wall and a bottom wall and an inductor forming member mounted on the peripheral wall of the cup-like yoke and including a ring-like portion fitted onto the peripheral wall of the rotor yoke and having the inductor magnetic poles formed thereon and securely mounted on the rotor yoke by forcing protrusions formed on the peripheral wall of the rotor yoke against the both axial ends of the ring-like portion.

4 Claims, 4 Drawing Sheets

ROTOR YOKE HAVING A RING-LIKE INDUCTOR FORMING MEMBER FOR AN ELECTRIC MACHINE ROTOR

TECHNICAL FIELD OF THE INVENTION

This invention relates to a rotor for an electric rotary machine having an inductor provided on a periphery thereof to generate signals for detecting a rotational angle position and/or a rotational speed of a rotary shaft and more particularly to a rotor for an electric rotary machine suitably used to generate signals for supplying an information on a crank angle of an internal combustion engine or an information on a rotational speed thereof to an ignition system and/or a fuel injection system of the engine.

BACKGROUND OF THE INVENTION

There are required signals containing the engine crank angle information and the rotational speed information for controlling an ignition timing in the ignition system and the fuel injection system for the internal combustion engine. In many cases, there has been used a signal generation device comprising an inductor type rotor mounted on a crankshaft of the engine and a signal generator to generate pulse signals by detecting edges of magnetic poles of the inductor of the rotor in order to obtain the crank angle information and the rotational speed information.

For some motors such as a brushless DC motor, an inductor type signal generation device has been used in case that the information on the rotational angle of the rotary shaft and on the rotational speed thereof are required.

As well known, the inductor type rotor comprises a rotor yoke formed of ferromagnetic material such as iron and/or the like and, on a periphery of the rotor yoke, inductor magnetic poles which may be of a protrusion or a recess are provided.

The signal generator to generate the pulse signals by detecting the edges of the inductor magnetic poles comprises an iron core having a magnetic pole provided at its leading end so as to be faced to the inductor magnetic poles, a signal coil wound on the iron core and a permanent magnet magnetically bonded to the iron core. The signal generator induces the pulse signals at the signal coil due to variation in magnetic flux flowing through the iron core when the forward edge of the inductor magnetic poles as viewed in the rotational direction begins to be faced to the magnetic pole of the iron core on which the signal coil is wound and when the rearward edge of the inductor magnetic poles ends to be faced to the magnetic pole of the signal generator.

In some cases, the rotor yoke of the inductor type rotor is exclusively provided for the signal generation device, but in case that the rotor of the magneto generator is mounted on the crankshaft of the internal combustion engine, the rotor yoke of the magneto generator is commonly used for the rotor yoke of the inductor type rotor.

In some signal generation devices for obtaining the information on the rotational angle of the rotary shaft of the motor having an outer rotor, the rotor yoke of the motor may be commonly used for the rotor yoke of the signal generation devices.

The rotor yoke of the electric rotary machine such as the magneto generator or the outer rotor type motor comprises a cup-like member having a cylindrical peripheral wall and a bottom wall provided so as to close one axial end of the peripheral wall and a boss provided on a central portion of the bottom wall is mounted on the crankshaft of the engine. On an inner surface of the peripheral wall of the rotor yoke, a permanent magnet is mounted, for example, which forms a magnetic field system of the rotor.

In an inner side of the rotor, an armature comprising an armature core and an armature coil wound on the armature core is disposed, and the electric rotary machine is formed by the armature and the rotor.

In case that the rotor yoke of the electric rotary machine such as the magneto generator or the motor is commonly used for the rotor yoke of the signal generation device, the inductor magnetic poles of projections or recesses are provided on the outer surface of the peripheral wall of the rotor yoke.

In the conventional rotor having the inductor magnetic poles provided on the outer periphery thereof, the inductor magnetic poles are directly formed on the outer surface of the peripheral wall of the rotor yoke, or a ring-like inductor forming member having the inductor magnetic poles provided on its outer surface is fixed to the outer surface of the rotor yoke by shrinkage fit.

In case that the inductor magnetic poles are directly formed on the outer surface of the peripheral wall of the rotor yoke of the electric rotary machine, the inductor magnetic poles may be formed by embossing portions of the peripheral wall of the rotor yoke in an outwardly radial direction. However, with the inductor magnetic poles formed by embossing the portions of the peripheral wall of the rotor yoke in this manner, the peripheral wall of the rotor yoke disadvantageously tends to have much strain applied thereto because force is locally applied to the peripheral wall of the rotor yoke when it is embossed, especially if it has many inductor magnetic poles.

It will be considered that the inductor magnetic poles may be formed by cutting the outer periphery of the rotor yoke, but this is inevitably expensive.

In order to avoid this, it has been tried to mount the inductor forming member having the ring-like portion and the inductor magnetic poles formed on the outer surface of the ring-like portion on the outer surface of the peripheral wall of the rotor yoke by shrinkage fit. However, if the shrinkage fit is loose, the inductor forming member is shifted relative to the rotor yoke so that the phase of the signals generated by the signal generation device is also shifted, which disadvantageously fails to obtain the accurate rotational angle information from the signal. Thus, in case that the inductor forming member is mounted by shrinkage fit, it should be severely managed, but this requires more steps for the management of the precision in size when the inductor forming member and the rotor yoke are manufactured and therefore this cannot avoid high cost.

Furthermore, because higher force is applied to the peripheral wall of the rotor yoke when the inductor forming member is fixed to the rotor yoke by shrinkage fit, the strain in the peripheral wall of the rotor yoke disadvantageously gets higher as it is thinner.

SUMMARY OF THE INVENTION

Accordingly, it is a principal object of the invention to provide a rotor for an electric rotary machine in which a ring-like inductor forming member can be mounted on a periphery of a rotor yoke without any large strain in a peripheral wall of the rotor yoke.

It is another object of the invention to provide a rotor for an electric rotary machine in which inductor magnetic poles can be formed on a periphery of a rotor yoke without any troublesome process such as cutting and without any shrinkage fit which requires a troublesome management of manufacturing steps.

It is further object of the invention to provide a rotor for an electric rotary machine in which an inductor forming member can be positively positioned on and fixed to a periphery of a rotor yoke so that the inductor magnetic poles are never shifted relative to the rotor yoke.

In accordance with one aspect of the present invention, there is provided a rotor for an electric rotary machine comprising; a rotor yoke having a cylindrical peripheral wall and a bottom wall provided integrally with the peripheral wall so as to close one axial end of the peripheral wall and having a boss provided at a central portion of the bottom wall for mounting a rotary shaft; an inductor forming member having a ring-like portion and inductor magnetic poles formed on an outer surface of the ring-like portion, the ring-like portion fitted onto an outer surface of the rotor yoke; and the inductor forming member being fixed to the rotor yoke by forcing protrusions formed on the peripheral wall of the rotor yoke against both of axial ends of the ring-like portion.

The protrusions may be formed by embossing portions of the peripheral wall of the rotor yoke. Although this requires embossing process, the embossed protrusions are required to have just the number necessary for fixing the inductor forming members and not required to have the number corresponding to the number of the inductor magnetic poles. Thus it will be noted that, in case that many inductor magnetic poles are provided, the rotor yoke never has high strain even though the protrusions are formed by embossing.

In a preferred form, the peripheral wall of the rotor yoke may have a plural of protrusions formed on an outer surface thereof by embossing, which includes a first protrusion portion extending in an axial direction of the rotor yoke and a second protrusion portion extending in a circumferential direction of the rotor yoke. In this case, the inductor forming member may have recesses on an inner surface of the ring-like portion and the inductor forming member is positively positioned in the circumferential direction by engaging the first protrusion portions with the recesses. The inductor forming member is positively positioned on the rotor yoke in the axial direction by forcing the second protrusion portion of each of the protrusions against one of the axial ends of the ring-like portion of the inductor member and by forcing a projection formed by raising the end of the first protrusion portion against the other end of the ring-like portion.

With the rotor constructed in this manner, since the inductor forming member can be positively positioned not only in the circumferential direction, but also in the axial direction relative to the rotor yoke, there can be obtained the rotor for the electric rotary machine which never fails to shift the position of the inductor.

In another preferred form, the plural of protrusions extending in the axial direction may be formed on the outer periphery of the rotor yoke by embossing, and the inductor forming member may be positioned in the circumferential direction by engaging each of the protrusions with recesses provided in an inner surface of the ring-like portion of the inductor forming member. The inductor forming member may be positioned in the axial direction by forcing the protrusion portions formed by raising both ends of each of the protrusions against both axial ends of the ring-like portion of the inductor forming member.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF PREFERRED EMBODIMENTS

Figure 2:
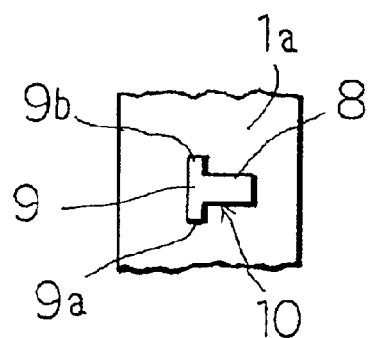
FIG. 2 is a side view of one of protrusions provided on a peripheral wall of a rotor yoke used for the rotor of FIG. 1.
Figure 3:
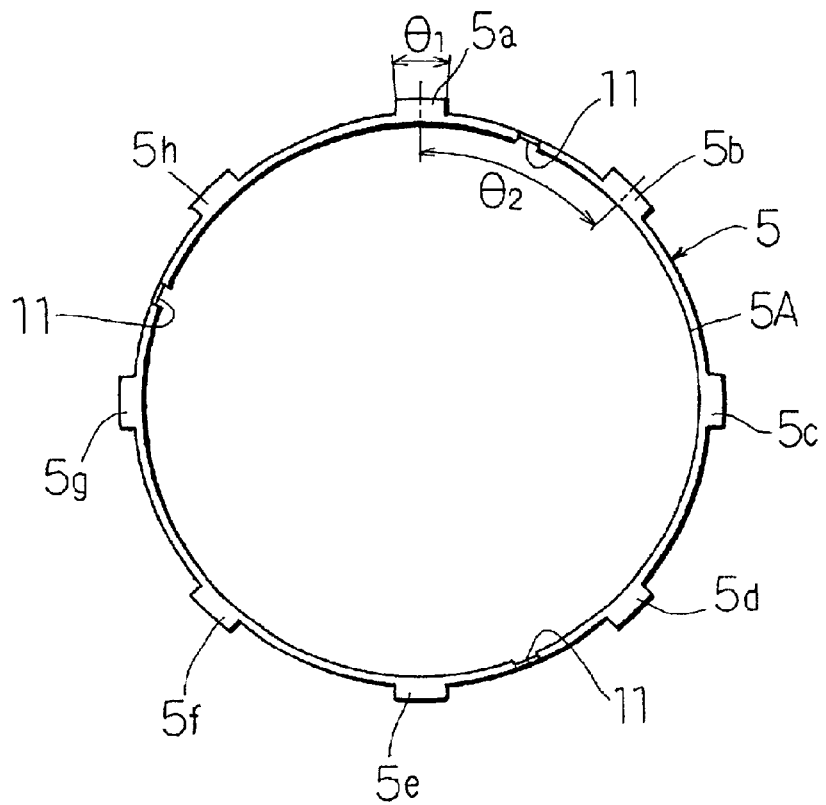
FIG. 3 is a front view of an inductor forming member used for the rotor of FIG. 1.
Figure 4:
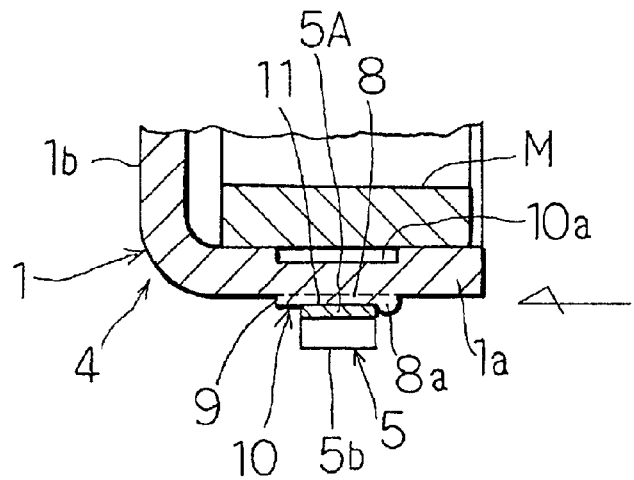
FIG. 4 is an enlarged cross sectional view of the rotor taken along the line IV—IV of FIG. 1.

Referring now to FIGS. 1 through 4, there is shown an electric rotor for a magneto generator driven by a crankshaft of an internal combustion engine as an example of an electric rotary machine to which the invention is applied. A cup-like rotor yoke 1 comprises a cylindrical peripheral wall 1a and a bottom wall 1b provided integrally with the peripheral wall 1a so as to close one of axial ends of the peripheral wall 1a. The rotor yoke 1 is formed of a ferromagnetic material such as an iron or the like. A boss member 2 may be integrally provided with the bottom wall 1b at its central portion with a flange 2a thereof bonded thereto by rivets 3. A not shown cylindrical boss may be provided integrally with the flange 2a of the boss member 2 so that it protrudes into the rotor yoke 1. A hole 2b for mounting a rotary shaft may be provided in the boss at its central portion so as to extend through the boss in an axial direction. As shown in FIG. 4, a permanent magnet M is mounted on an inner surface of the peripheral wall 1a of the rotor yoke 1. A rotor 4 for the magneto generator is formed by the permanent magnet M and the rotor yoke 1. The rotor is mounted on the not shown crankshaft of the engine with the crankshaft extending through the hole 2b in the boss member 2 of the rotor yoke 2 and tightening the crankshaft and the boss member 2 with each other by not shown tightening members.

Inside of the rotor 4, it is disposed an armature having an armature core and an armature coil wound on the armature core and fixed to a crankcase of the engine. The magneto generator is formed by the armature and the rotor 4.

On an outer surface of the rotor yoke 1 of the rotor 4, an inductor forming member 5 formed of a ferromagnetic material such as an iron or the like is mounted. As shown in FIG. 3, the inductor forming member 5 comprises a ring-like portion 5A having an inside diameter slightly larger than an outside diameter of the peripheral wall 1a of the rotor yoke 1 and having a number of inductor magnetic poles (reluctors) 5a through 5h of protrusion provided integrally with and protruding from the outer surface of the ring-like portion 5A. The inductor forming member 5 is fixed to the rotor yoke 1 with the ring-like portion 5A fitted onto the outer surface of the rotor yoke 1. The inside diameter of the ring-like portion 5A and the outside diameter of the rotor yoke 1 are so set that they are fitted onto each other in the condition between the gap fit and the tight fit.

A polar arc angle ζ 1 of each of the inductor magnetic poles is so set at an appropriate degree in accordance with the generation distance of the pulse signals generated by the signal generator when each of the inductor magnetic poles passes the position where the magnetic poles of the signal generator which will be described later are disposed. The number of the illustrated inductor magnetic poles is set properly in accordance with the use of the signals generated by the signal generator. In the illustrated embodiment, there are provided the eight inductor magnetic poles 5a through 5h, but in some cases more inductor magnetic poles may be provided so that the crank angle of the engine should be more finely detected. In some cases, the inductor magnetic poles having the number equal to the number of the cylinders of the engine may be provided so that the signal generator should generate the pulse signal to detect a reference rotational angle position of the crankshaft relative to each of the cylinders of the engine. Although, in the illustrated embodiment, the inductor magnetic poles are disposed at an equal distance of angle θ 2, they may be disposed at an unequal distance in accordance with the use thereof.

Figure 1:
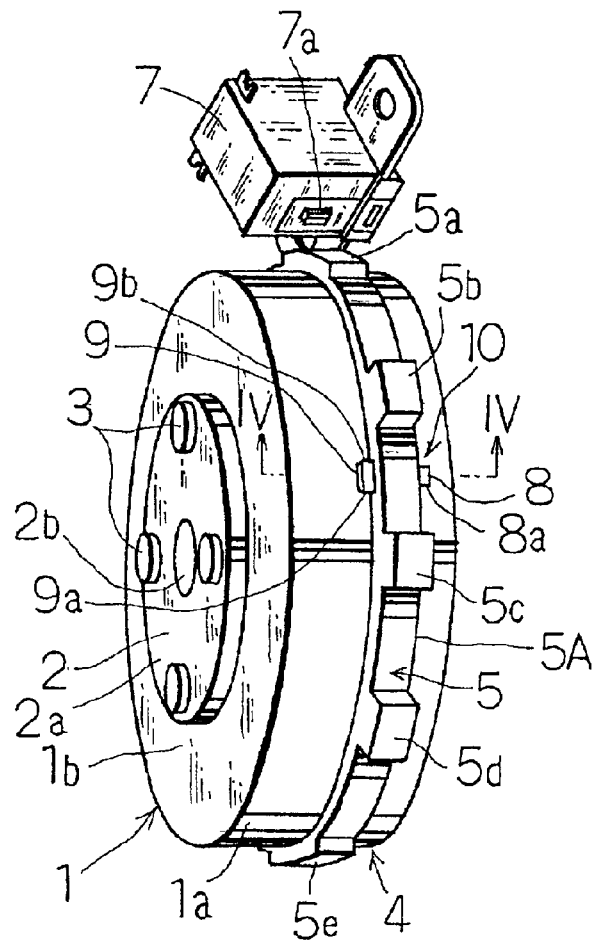
FIG. 1 is a perspective view of a rotor for a magneto generator driven by a crankshaft of an internal combustion and constructed in accordance with one embodiment of the invention.

The signal generator is designated by a reference numeral 7 in FIG. 1. The signal generator 7 comprises a not shown core having a magnetic pole 7a provided at its front end, a signal coil wound on the core and a permanent magnet magnetically bonded to the core, all of which are contained in a case 7b. The signal generator 7 may be mounted on a mount of the crankcase of the engine with the magnetic pole 7a faced to the inductor forming member 5 and with a predetermined air gap formed between the magnetic pole 7a and each of the inductor magnetic poles 5a through 5h.

As the rotor 4 rotates together with the not shown crankshaft of the engine, the signal coil induces the pulse signals of one polarity due to variation in the magnetic flux flowing through the core of the signal generator 7 when the front edges of the inductor magnetic poles 5a through 5h as viewed in the rotational direction begin to be faced to the magnetic pole 7a of the signal generator 7. Also, the signal coil induces the pulse signals of other polarity due to variation in the magnetic flux flowing through the core of the signal generator 7 when the rear edges of the inductor magnetic poles 5a through 5h as viewed in the rotational direction end to be faced to the magnetic pole 7a of the signal generator 7. Since the position where these pulse signals are generated is determined on the one where the inductor magnetic poles are provided, there can be detected the predetermined rotational angle position of the crankshaft of the engine from the pulse signals. Also, there can be detected the rotational speed of the engine by measuring the distance of generation of the series of the pulse signals generated when the series of the inductor magnetic poles 5a through 5h pass the position where the magnetic pole 7a of the signal generator 7 is provided.

The inductor forming member 5 should be positively fixed to the outer surface of the peripheral wall of the rotor yoke 1 so that the position of the inductor forming member is never shifted when the rotor 4 rotates. To this end, in the illustrated embodiment, a plural of protrusions 10 may be provided at an equal angular distance as shown in FIGS. 2 and 4 by embossing portions of the peripheral wall 1a of the rotor yoke 1 from the inside toward the outside. The inductor forming member can be positioned relative to and fixed to the rotor yoke 1 by using these protrusions 10.

The protrusions 10 shown in FIG. 2 comprise a first I-shaped protrusion portion 8 extending in an axial direction of the rotor yoke 1 along the outer surface of the peripheral wall thereof and a second I-shaped protrusion portion 9 extending in a circumferential direction of the rotor yoke 1. The second protrusion portion 9 of each of the protrusions 10 is provided so that the middle portion of the second protrusion portion 9 communicates with one end of the first protrusion portion 8. As shown in FIG. 4, there is formed a recess 10a in the inner surface of the peripheral wall 1a of the, rotor yoke 1 by embossing a portion thereof to form each of the protrusions 10.

In the inner surface of the ring-like portion 5A of the inductor forming member 5, three recesses 11 corresponding to the first protrusion portions 8 of the three protrusions 10 are provided at 120 degrees. The inductor forming member 5 is fitted onto the outer surface of the peripheral wall 1a of the rotor yoke 1 with the recesses 11 of the inductor forming member 5 engaged with the corresponding first protrusion portions 8 of the rotor yoke 1. The inductor forming member 5 is positioned toward one side in the axial direction by the both of wing portions 9a and 9b of the second protrusion portions 9 protruding from both sides of the first protrusion portions 8 abutting against one axial end of the ring-like portion 5A of the inductor forming member 5. Projections 8a are formed by deforming and raising metal material of the first protrusion portions 8 adjacent to the side opposite to the second protrusion portions 9 as shown in FIG. 4 by applying the force to the opposite side of the first protrusion portions in the axial direction (the direction indicated by an arrow of FIG. 4) of the rotor yoke 1 while the second protrusion portions 9 on the side opposite to the first protrusion portions is stopped by a not shown stopper. The inductor magnetic poles 5 can be fixed to the rotor yoke 1 by forcing the projections 8a against the other axial end of the ring-like portion 5A of the inductor forming member 5.

With the rotor constructed in this manner, the inductor magnetic poles 5 can be positioned in the circumferential direction by the engagement of the recesses 11 in the ring-like portion 5A with the first protrusion portions 8 on the outer surface of the peripheral wall of the rotor yoke 1. Also, the inductor forming member 5 can be positioned in the axial direction of the rotor yoke 1 by the wing-like portions 9a and 9b of the second protrusion portions 9 and the projections 8a of the first protrusion portions 8 abutting against one and other axial ends of the ring-like portion 5A, respectively. Thus it will be noted that the inductor magnetic poles 5 can be positively fixed to the rotor yoke 1 not only in the circumferential direction, but also in the axial direction without any shrinkage fit.

Furthermore, since there is required no severe management of size of various portions which is required for the shrinkage fit, the number of processing steps can be reduced and also the cost of manufacture can be lowered.

Although, in the present invention, the protrusions 10 are formed by embossing, since the number (three, in the illustrated embodiment) of the protrusions 10 may be the minimum one required for fixing the inductor magnetic poles 5 to the rotor yoke 1, the strain in the rotor yoke 1 can be made smaller in comparison with the prior art in which all the inductor magnetic poles 5a through 5h are formed by embossing. This can prevent such strain as a practical obstacle from being generated.

Figure 5A:
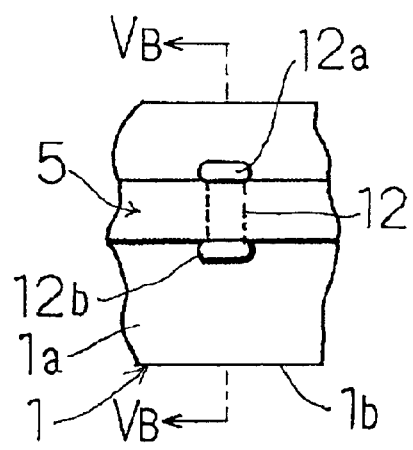
FIG. 5A is an enlarged front view of the rotor portion similar to FIG. 4, but constructed in accordance with another embodiment of the invention.
Figure 5B:
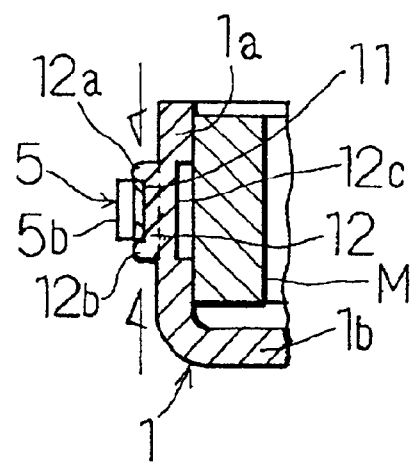
FIG. 5B is a cross sectional view of the rotor portion taken along the line VB—VB of FIG. 5A.

FIGS. 5A and 5B illustrate another embodiment of the rotor in which a plural of (three in the preferred embodiment) I-shaped protrusions 12 extending in the axial direction of the rotor yoke 1 are formed at an equal angular distance by embossing portions of the peripheral wall 1a of the rotor yoke 1 from the inside toward the outside. In FIG. 5B, recesses 12c are formed by embossing the protrusions 12.

In the inner surface of the ring-like portion 5A of the inductor forming member 5, recesses 11 corresponding to the protrusions 12 are formed in the same manner as the recesses in the embodiment of FIG. 3. The inductor forming member 5 is fitted onto the outer surface of the rotor yoke 1 with the recesses 11 in the ring-like portion 5A being engaged with the corresponding protrusions 12. The length of each of the protrusions 12 is so set that both ends of each protrusion 12 protrudes from both axial ends of the ring-like portion 5A with the recesses 11 in the ring-like portion 5A being engaged with the corresponding protrusions 12.

Projections 12a and 12b may be formed at both ends of each of the protrusions 12 by deforming and raising its metal material adjacent to both ends. The inductor forming member 5 is fixed to the rotor yoke 1 by forcing these projections 12a and 12b against one and other axial ends of the ring-like portion 5A of the inductor forming member 5, respectively.

In the same manner as the embodiment of FIGS. 3 and 4, in the embodiment of FIGS. 5A and 5B, since the inductor forming member 5 is positioned in the circumferential direction with the engagement of the recesses 11 in the inductor forming member 5 with the protrusions 12 on the outer surface of the rotor yoke 1 and in the axial direction with the projections 12a and 12b on both ends of the protrusions 12 abutting against the axial ends of the ring-like portion 5A of the inductor forming member 5, the inductor forming member 5 can be positively fixed to the rotor yoke 1.

In the embodiment of FIGS. 5A and 5B, since the protrusions 12 are of I-shape, they can be more easily formed by embossing.

Figure 6A:
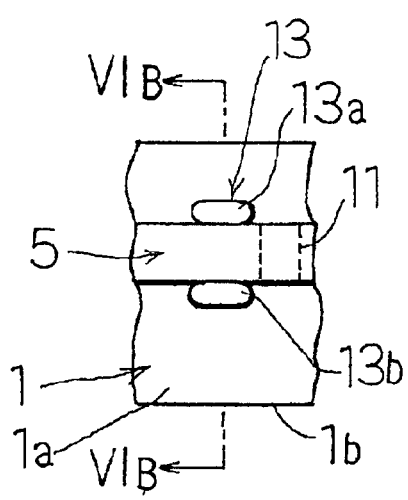
FIG. 6A is an enlarged front view of the rotor portion similar to FIG. 5A, but constructed in accordance with further embodiment of the invention.
Figure 6B:
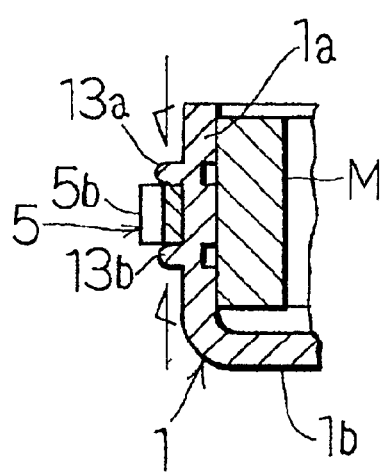
FIG. 6B is a cross sectional view of the rotor portion taken along the line VIB—VIB of FIG. 6A.

FIGS. 6A and 6B illustrate further embodiment of the rotor in which a plural of (three in the preferred embodiment) protrusions 13 each including a pair of protrusion portions 13a and 13b faced to each other at a distance slightly larger than an axial size (width size) of the ring-like portion 5A of the inductor forming member 5 in the axial direction of the rotor yoke 1 are formed on the outer surface of the peripheral wall 1a of the rotor yoke 1 at an equal angular distance by embossing portions of the peripheral wall 1a of the rotor yoke 1 from the inside toward the outside. The protrusion portions 13a and 13b may have such a size as can pass through the recesses 11 in the ring-like portion 5A of the inductor forming member 5 before it is fixed.

When the inductor forming member 5 should be fixed to the rotor yoke 1, the ring-like portion 5A of the inductor forming member 5 is fitted onto the peripheral wall 1a of the rotor yoke 1 while the recesses 11 in the ring-like portion of the inductor forming member 5 are positioned so as to correspond to the respective protrusions 13 of the rotor yoke 1 and the ring-like portion 5A is positioned between the pair of the projections 13a and 13b. Thereafter, the recesses 11 in the ring-like portion 5A are positioned so as to come off from the pair of the projections 13a and 13b by rotating the inductor forming member 5. In this condition, the projections 13a and 13b are pressed in the direction indicated by arrows of FIG. 6B so that the projections 13a and 13b are forced against one and other of the axial ends of the ring-like portion 5A, respectively, whereby the inductor forming member 5 is fixed to the rotor yoke 1. Since the pair of projections 13a and 13b are crushed by the press, they are deformed to the size so that they cannot pass through the recesses 11.

In the same manner, with the rotor constructed in accordance with the embodiment of FIGS. 6A and 6B, since the inductor forming member 5 can be fixed to the rotor yoke 1 by forming the protrusions of the minimum number by embossing. Thus, it will be noted that the inductor forming member 5 can be fixed to the rotor yoke 1 without any shrinkage fit and therefore without applying much strain to the peripheral wall 1a of the rotor yoke 1.

Figure 7:
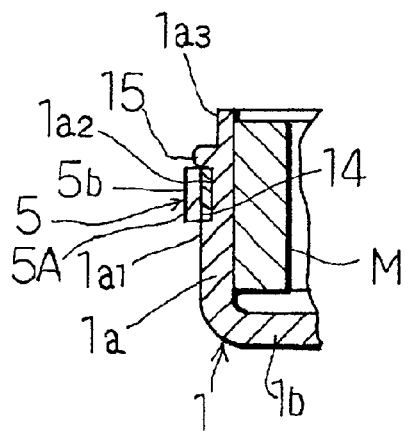
FIG. 7 is a vertical cross sectional view of the rotor portion similar to FIG. 4, but constructed in accordance with further embodiment of the invention.
Figure 8:
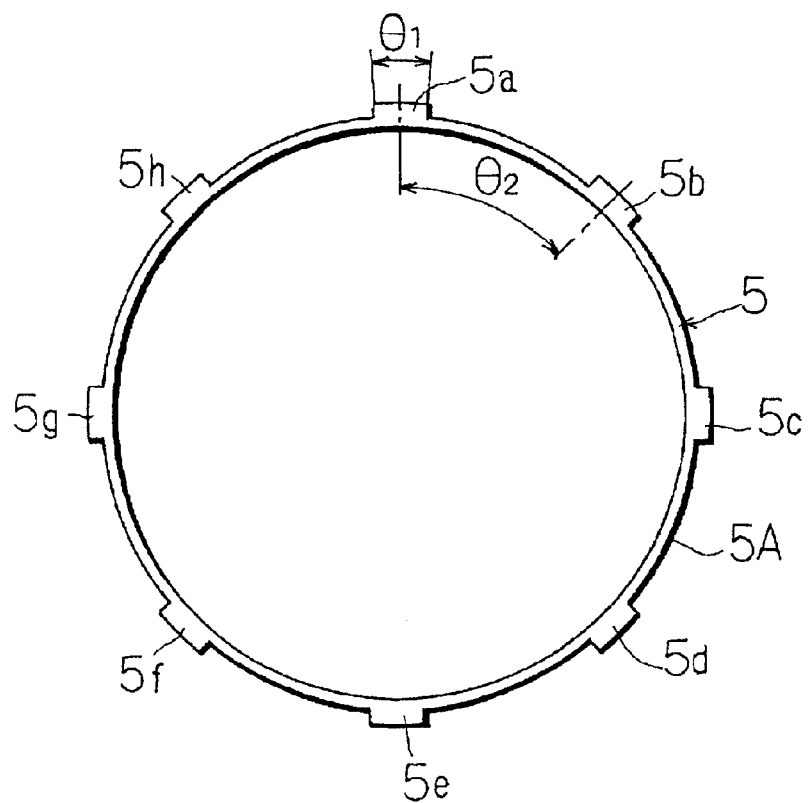
FIG. 8 is a front view of the inductor forming member used for the embodiment of FIG. 7.

FIGS. 7 and 8 illustrate further embodiment of the invention. In the embodiment, the peripheral wall 1a of the rotor yoke 1 comprises a first outer peripheral area 1a1 having a first outside diameter, a second outer peripheral area 1a2 having an outside diameter smaller than that of the first outer peripheral area and a third outer peripheral area 1a3 having an outside diameter smaller than that of the second outer peripheral area sequentially arranged in order in the axial direction of the rotor yoke 1. These areas can be formed by cutting the outer surface of the rotor yoke 1 in the circumferential direction. Since the cutting may be successively done all over the periphery of the rotor yoke 1 by a lathe, it can be more simply done in comparison with the case in which a number of inductor magnetic poles are formed by cutting the periphery of the rotor yoke 1.

In the illustrated embodiment, the first through third outer peripheral areas 1a1 through 1a3 are formed with the first outer peripheral area 1a1 positioned on the side of the bottom wall 1b of the rotor yoke 1 and with the third outer peripheral area 1a3 positioned on the side of the opening of the peripheral wall 1b of the rotor yoke 1.

The second outer peripheral area 1a2 on the peripheral wall 1a of the rotor yoke 1 is so set as to have a size larger than the width of the ring-like portion 5A of the inductor forming member 5 and the inductor forming member 5 having no recesses in the inner periphery thereof as shown in FIG. 8 is fitted onto the outer surface of the second outer peripheral area 1a2 of the rotor yoke 1. The inductor forming member 5 is fixed to the rotor yoke 1 by forcing a shoulder 14 between the first and second outer peripheral areas 1a1 and 1a2 against one axial end of the ring-like portion 5A of the inductor forming member 5 and by forcing a projection or projections 15 of the second outer peripheral area 1a2 on the side of the third outer peripheral area 1a3 against the other axial end of the ring-like portion 5A of the inductor forming member 5. The projection or projections 15 of the second outer peripheral area 1a3 may be formed by deforming it by a press. The projection 15 may be successively formed along the outer surface of the rotor yoke 1 or a plural of projections 15 may be formed in a spaced manner.

The projection or projections and the protrusion are generally referred to as "protrusion means" in the specification and claims.

A plural of projections 15 may be previously formed at the end of the second outer peripheral area 1a2. For instance, if the three projections 15 should be previously formed at a distance of 120 degree angle, there is used the inductor forming member 5 having the recesses 11 formed therein corresponding to the projections 15 in the same manner as shown in FIG. 3 while the recesses 11 are so set as to have the size which allows the projections 15 to pass through the recesses 11. After the ring-like portion 5A of the inductor forming member 5 is fitted onto the outer surface of the second outer peripheral area 1*a*2 of the rotor yoke 1 while the recesses 11 is positioned so as to correspond to the projections 15, the recesses 11 are positioned so as to be off from the projections 15 by rotating the inductor forming member 5. In this condition, the inductor forming member 5 is fixed to the rotor yoke 1 by the projections 15 abutting against the ring-like portion 5A of the inductor forming member 5, which can be accomplished by forcing the projections 15 against the ring-like portion 5A by the press.

Although, in the illustrated embodiments, the invention is applied to the magneto generator, it may be applied to other electric rotary machines such as an electric motor having inductor magnetic poles provided on an outer surface of a rotor yoke or the like.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A rotor for an electric rotary machine comprising:
    a rotor yoke having a cylindrical peripheral wall with a first axial end and a second axial end opposite the first axial end, a bottom wall provided integrally with said peripheral wall so as to close the first axial end of said peripheral wall, and a boss provided at a central portion of said bottom wall for mounting a rotary shaft, and
    an inductor forming member fitted onto the outer surface of said peripheral wall, said inductor forming member having a ring-like portion and inductor magnetic poles formed on an outer surface of said ring-like portion, said ring-like portion having a first axial end and a second axial end opposite the first axial end of the ring-like portion, and an inner surface of said ring-like portion fitted against the outer surface of said peripheral wall of the rotor yoke,
    said peripheral wall further comprises an inner surface and an outer surface and at least one protrusion on the outer surface of the peripheral wall, said protrusion including a first protrusion portion extending in an axial direction of said rotor yoke and a second protrusion portion extending in a circumferential direction of said rotor yoke at a first end of said first protrusion portion, said first protrusion portion including a projection extending from a second end of said first protrusion portion,
    said inner surface of said ring-like portion further comprising at least one recess corresponding to each first protrusion portion so that each first protrusion portion is engaged with a corresponding recess,
    wherein said second protrusion portion is located against the first axial end of said ring-like portion and said projection is against the second axial end of the ring-like portion when said ring-like portion is fitted against said peripheral wall of the rotor yoke.

2. A rotor for an electric rotary machine as set forth in claim 1, wherein said second protrusion portion is integrally formed with said first protrusion portion so that said protrusion is T-shaped.

3. A rotor for an electric rotary machine comprising
    a rotor yoke having a cylindrical peripheral wall with a first axial end and a second axial end opposite the first axial end, a bottom wall provided integrally with said peripheral wall so as to close the first axial end of said peripheral wall, and a boss provided at a central portion of said bottom wall for mounting a rotary shaft, and
    an inductor forming member fitted onto the outer surface of said peripheral wall, said inductor forming member having a ring-like portion and inductor magnetic poles formed on an outer surface of said ring-like portion, said ring-like portion having a first axial end and a second axial end opposite the first axial end of the ring-like portion, and an inner surface of said ring-like portion fitted against the outer surface of said peripheral wall of the rotor yoke,
    said peripheral wall further comprises an inner surface and an outer surface and at least one protrusion on the outer surface of the peripheral wall, said protrusion having a pair of protrusion portions extending in an axial direction of said peripheral wall, said pair being located faced to each other at a distance slightly larger than an axial size of said ring-like portion,
    said inner surface of said ring-like portion further comprising at least one recess corresponding to each protrusion so that each protrusion is engaged with a corresponding recess,
    wherein said pair is located against the first axial end of said ring-like portion and the second axial end of the ring-like portion when said ring-like portion is fitted against said peripheral wall of the rotor yoke.

4. A rotor for an electric rotary machine as set forth in either of claims 1, 2, and 3, wherein a permanent magnet forming a magnetic field system is mounted on the inner surface of said peripheral wall of said rotor yoke.

* * * * *